(12) United States Patent
Johnson

(10) Patent No.: US 11,067,254 B1
(45) Date of Patent: Jul. 20, 2021

(54) AUXILIARY LIGHT FOR MOUNTING TO A VEHICLE

(71) Applicant: Bestop Baja, LLC, San Marcos, CA (US)

(72) Inventor: Christopher Johnson, San Marcos, CA (US)

(73) Assignee: Bestop Baja, LLC, San Marcos, CA (US)

( * ) Notice: Subject to any disclaimer, the term of this patent is extended or adjusted under 35 U.S.C. 154(b) by 0 days.

(21) Appl. No.: 17/107,642

(22) Filed: Nov. 30, 2020

Related U.S. Application Data (63) Continuation of application No. 16/596,742, filed on Oct. 8, 2019.

(51) Int. Cl.
| | |
|---|---|
| *F21V 14/02* | (2006.01) |
| *F21V 23/00* | (2015.01) |
| *F21V 29/76* | (2015.01) |
| *F21S 45/48* | (2018.01) |
| *F21Y 115/30* | (2016.01) |
| *F21S 41/19* | (2018.01) |

(Continued)

(52) U.S. Cl.
CPC .......... *F21V 14/02* (2013.01); *F21V 23/004* (2013.01); *F21V 29/763* (2015.01); *F21S 41/19* (2018.01); *F21S 41/65* (2018.01); *F21S 45/48* (2018.01); *F21Y 2115/10* (2016.08); *F21Y 2115/30* (2016.08)

(58) Field of Classification Search
CPC ....... F21V 14/02; F21V 29/763; F21V 23/004
USPC ........................................................ 362/555
See application file for complete search history.

(56) References Cited

U.S. PATENT DOCUMENTS

| | | |
|---|---|---|
| 3,586,270 A | 6/1971 | Loffler et al. |
| 3,691,366 A | 9/1972 | Spreuer |

(Continued)

FOREIGN PATENT DOCUMENTS

| | | |
|---|---|---|
| CN | 101592301 | 12/2009 |
| CN | 102095172 | 6/2011 |

(Continued)

OTHER PUBLICATIONS

"Baja Designs LP9 8" 105W/21W Round LED Light." Found online Jul. 30, 2019 at www.carid.com. Product reviewed Apr. 23, 2018. Retrieved from URL: https://www.carid.com/baja-designs/baja-designs-off-road-lights-6697-72111.html#reviews (Year: 2018).

(Continued)

*Primary Examiner* — Bryon T Gyllstrom
(74) *Attorney, Agent, or Firm* — Lowe Graham Jones PLLC (57) ABSTRACT

An apparatus includes an auxiliary light includes a housing defining a front opening, a light emitting in the housing, and a transparent cover is mounted over the front opening. A plurality of fins are mounted to the housing and extend rearwardly from the front opening. The housing defines a cavity of non-rectangular shape from the opening to a backwall of the cavity. A circuit board has a perimeter conforming to the non-rectangular shape. The circuit board may include cutouts for a plug through the backwall. A heat conducting pad, such as graphite is interposed between the circuit board and the backwall and may likewise conform to the non-rectangular shape.

16 Claims, 8 Drawing Sheets

(51) Int. Cl.
*F21S 41/65* (2018.01)
*F21Y 115/10* (2016.01)

(56) References Cited

U.S. PATENT DOCUMENTS

| | | | |
|---|---|---|---|
| 3,949,218 A | 4/1976 | Hayward | |
| 4,074,124 A | 2/1978 | Maute et al. | |
| D248,691 S | 7/1978 | Cibie | |
| 4,167,783 A | 9/1979 | Mitchell | |
| 4,220,981 A | 9/1980 | Koether | |
| D259,516 S | 6/1981 | Catte | |
| D261,051 S | 9/1981 | Catte | |
| 4,319,311 A | 3/1982 | Mitchell | |
| D266,599 S | 10/1982 | Suzuki | |
| 4,357,651 A | 11/1982 | Mayer | |
| D274,000 S | 5/1984 | Bailly | |
| 4,636,922 A | 1/1987 | Takimoto et al. | |
| 4,722,031 A | 1/1988 | Matsuyama et al. | |
| 4,742,436 A | 5/1988 | Hoggett | |
| D304,380 S | 10/1989 | Bailly | |
| D304,621 S | 11/1989 | Schmidt | |
| D304,622 S | 11/1989 | Schmidt | |
| D304,861 S | 11/1989 | Schmidt | |
| 5,103,382 A | 4/1992 | Kondo et al. | |
| 5,103,385 A | 4/1992 | Federico et al. | |
| 5,107,406 A | 4/1992 | Sekido et al. | |
| 5,132,885 A | 7/1992 | Hocheim et al. | |
| 5,171,083 A | 12/1992 | Rich | |
| 5,611,510 A | 3/1997 | Yamamoto | |
| D383,227 S | 9/1997 | Nagano | |
| D385,982 S | 11/1997 | Moore | |
| D393,086 S | 3/1998 | Nagano | |
| 6,079,852 A | 6/2000 | Kamaya et al. | |
| 6,135,625 A | 10/2000 | Kodaira et al. | |
| 6,186,649 B1 | 2/2001 | Zou et al. | |
| 6,428,197 B1 | 8/2002 | Downing | |
| D490,172 S | 5/2004 | Yamamoto | |
| 6,764,206 B1 | 7/2004 | Felty | |
| 6,773,148 B2 | 8/2004 | Kasboske | |
| 6,783,266 B2 | 8/2004 | McCoy et al. | |
| D495,814 S | 9/2004 | James | |
| D513,599 S | 1/2006 | Coward | |
| D514,973 S | 2/2006 | Coward | |
| D520,656 S | 5/2006 | Shiu | |
| D526,430 S | 8/2006 | Hernandez et al. | |
| D530,029 S | 10/2006 | Neufeglise et al. | |
| D576,754 S | 9/2008 | Wang | |
| D578,681 S | 10/2008 | Huang | |
| 7,556,396 B2 | 7/2009 | Kuo et al. | |
| D625,452 S | 10/2010 | Yamada | |
| D634,871 S | 3/2011 | Wooh | |
| D640,819 S | 6/2011 | Pan | |
| D642,302 S | 7/2011 | Schiavone et al. | |
| 7,972,035 B2 | 7/2011 | Boyer | |
| D643,951 S | 8/2011 | Cai | |
| 8,021,024 B2 | 9/2011 | Huang | |
| 8,066,404 B2 | 11/2011 | Song | |
| 8,083,366 B1 | 12/2011 | Backer | |
| D653,783 S | 2/2012 | Biro et al. | |
| 8,330,362 B2 | 12/2012 | Lin | |
| D676,990 S | 2/2013 | Adams | |
| D688,399 S | 8/2013 | Adams | |
| D689,232 S | 9/2013 | Velazquez | |
| D694,928 S | 12/2013 | Chen | |
| D700,385 S | 2/2014 | Quadri | |
| D702,866 S | 4/2014 | Blincoe et al. | |
| 8,714,792 B2 | 5/2014 | Adams | |
| D712,077 S | 8/2014 | Leban et al. | |
| 8,827,518 B2 * | 9/2014 | Smith | B60Q 1/2615 362/497 |
| D725,806 S | 3/2015 | Yakushi | |
| D729,677 S | 5/2015 | Aho | |
| D735,908 S | 8/2015 | Ko | |
| D737,482 S | 8/2015 | Kuge | |
| D740,473 S | 10/2015 | Chen | |
| D747,516 S | 1/2016 | Yang | |
| D748,831 S | 2/2016 | Fan | |
| D749,253 S | 2/2016 | Marroquin | |
| D754,891 S | 4/2016 | Leban et al. | |
| D762,315 S | 7/2016 | Lin | |
| 9,403,476 B2 | 8/2016 | Hausler et al. | |
| D766,473 S | 9/2016 | Riedel et al. | |
| D766,499 S | 9/2016 | Packard et al. | |
| 9,452,707 B1 | 9/2016 | Tsai | |
| D768,896 S | 10/2016 | Smith | |
| D788,334 S | 5/2017 | Jacq et al. | |
| 9,739,462 B2 | 8/2017 | Georgitsis | |
| D799,080 S | 10/2017 | Dennis et al. | |
| 9,800,017 B1 | 10/2017 | Raring et al. | |
| D802,197 S | 11/2017 | Ding et al. | |
| 9,829,182 B1 | 11/2017 | McCaslin et al. | |
| D806,299 S | 12/2017 | Gebhard et al. | |
| 9,835,296 B2 | 12/2017 | Goutain et al. | |
| D815,318 S | 4/2018 | LaMarche et al. | |
| 10,050,415 B1 | 8/2018 | Raring et al. | |
| D827,883 S | 9/2018 | Deyaf et al. | |
| 10,084,281 B1 | 9/2018 | Raring et al. | |
| 10,197,227 B2 * | 2/2019 | Williamson | F21V 7/28 |
| D845,532 S | 4/2019 | Zhu | |
| D849,293 S | 5/2019 | Ko | |
| 10,309,592 B2 | 6/2019 | Roach et al. | |
| D854,206 S | 7/2019 | Yang | |
| 2002/0036908 A1 | 3/2002 | Pederson | |
| 2002/0085390 A1 * | 7/2002 | Kiyomoto | F21V 7/0091 362/555 |
| 2004/0085779 A1 * | 5/2004 | Pond | F21S 41/321 362/516 |
| 2004/0223342 A1 * | 11/2004 | Klipstein | G01N 21/91 362/555 |
| 2005/0128768 A1 * | 6/2005 | Martineau | F21V 5/04 362/555 |
| 2006/0126325 A1 | 6/2006 | Lefebvre et al. | |
| 2006/0262544 A1 * | 11/2006 | Piepgras | F21V 29/763 362/373 |
| 2008/0285271 A1 * | 11/2008 | Roberge | F21V 29/677 362/235 |
| 2010/0171606 A1 | 7/2010 | Law et al. | |
| 2010/0204841 A1 * | 8/2010 | Chemel | F21V 29/67 700/282 |
| 2010/0254148 A1 | 10/2010 | Huang | |
| 2010/0309664 A1 | 12/2010 | Liu | |
| 2010/0328945 A1 | 12/2010 | Song | |
| 2011/0002120 A1 | 1/2011 | Song | |
| 2011/0141723 A1 | 6/2011 | Lai et al. | |
| 2011/0182065 A1 * | 7/2011 | Negley | F21K 9/62 362/231 |
| 2011/0211330 A1 | 9/2011 | Wang | |
| 2012/0099326 A1 | 4/2012 | Hammond et al. | |
| 2012/0106152 A1 | 5/2012 | Zheng | |
| 2012/0218757 A1 | 8/2012 | Gill | |
| 2013/0155688 A1 * | 6/2013 | LaVigna | F21V 29/74 362/311.01 |
| 2013/0235583 A1 | 9/2013 | Chang | |
| 2013/0271977 A1 | 10/2013 | Ronen | |
| 2013/0278139 A1 | 10/2013 | Sievers et al. | |
| 2013/0329413 A1 | 12/2013 | Cotta, Sr. et al. | |
| 2014/0063811 A1 | 3/2014 | Yun | |
| 2014/0078762 A1 | 3/2014 | Adams | |
| 2014/0146544 A1 * | 5/2014 | Gebhard | F21V 5/007 362/311.02 |
| 2014/0192545 A1 | 7/2014 | Law et al. | |
| 2014/0301101 A1 | 10/2014 | Russ | |
| 2014/0317916 A1 | 10/2014 | Clifford | |
| 2015/0285472 A1 | 10/2015 | Evitt | |
| 2015/0316238 A1 | 11/2015 | Guilmette | |
| 2015/0323147 A1 | 11/2015 | Kanayama et al. | |
| 2017/0030566 A1 * | 2/2017 | Milam | F21V 29/51 |
| 2017/0184271 A1 | 6/2017 | Norris et al. | |
| 2017/0297480 A1 | 10/2017 | Elwell et al. | |
| 2017/0313244 A1 | 11/2017 | Luciew | |
| 2017/0327027 A1 | 11/2017 | Takaya et al. | |
| 2018/0022268 A1 | 1/2018 | Xie | |

(56) References Cited

U.S. PATENT DOCUMENTS

2018/0080616 A1 3/2018 Elwell et al.
2018/0202622 A1 7/2018 Arce
2019/0093851 A1 3/2019 Johnson et al.

FOREIGN PATENT DOCUMENTS

| CN | 202708679 U | 1/2013 |
| CN | 203940377 U | 11/2014 |
| CN | 104641173 | 5/2015 |
| CN | 205118860 U | 3/2016 |
| CN | 105650568 | 6/2016 |
| JP | 2012-22807 | 2/2012 |
| KR | 10-1251079 | 3/2013 |
| KR | 10-2015-0128313 | 11/2015 |
| KR | 10-1707890 | 2/2017 |
| TW | D161541 | 7/2014 |
| TW | D175903 | 5/2016 |
| TW | D188091 | 1/2018 |

OTHER PUBLICATIONS

"BajaDesigns LP9 LED Driving/Combo Light." Found online Jul. 30, 2019 at www.amazon.com. Product first available Nov. 8, 2017. Retrieved from URL: https://www.amazon.com/BajaDesigns-LP9-Driving-Combo-Light/dp/B0778XHKDW (Year: 2017).

"Machine Tool Design Manual", Oct. 31, 1997, Compile Group of Machine Tool Design Manual, pp. 548-549.

"Practical Cold Extrusion Technology", Dec. 31, 2005, Jin Rengang, pp. 1-4.

"Side Shooter LED Pods, AAIWA." Found online Jul. 30, 2019 at www.amazon.com. Product first available Apr. 18, 2019. Retrieved from URL: https://tinyurl.com/y6gto6fp (Year: 2019).

Taiwan IPO Search Report for Taiwan Design Patent Application No. 107302183, Completed Aug. 27, 2018.

"YouTube—The LP9 from Baja Designs." Found online Jul. 30, 2019 at www.youtube.com. Video published Aug. 29, 2017. Retrieved from URL: https://www.youtube.com/watch?v=2NSPgpvC3yc (Year: 2017).

* cited by examiner

AUXILIARY LIGHT FOR MOUNTING TO A VEHICLE

FIELD OF THE INVENTION

This application relates to auxiliary lights for securing to a vehicle.

BACKGROUND OF THE INVENTION

In many off-road and recreational vehicular activities, it is desirable to provide additional lighting. For example, an additional lighting apparatus may be used to project light forward or around a vehicle such as motorcycles, boats, utility vehicles, aircraft, construction and other equipment to increase operator visibility.

Adding additional light sources to achieve a desired short or long-distance illumination would in many applications exceed the space available or power capacity of the vehicle or equipment's capabilities. Recent developments in lighting sources including Light Emitting Diodes ("LED") and laser/phosphorus or gallium white light emitters, which permit greatly improved directional and surrounding illumination given the same amount of available space and electrical power without extensive or expensive modifications to the vehicle or its electrical systems.

In view of the foregoing, it would be an improvement in the art to improve the function and utility of auxiliary lighting for a vehicle.

SUMMARY OF THE INVENTION

In one aspect of the invention, an auxiliary light includes a housing defining a front opening extending in a horizontal direction and a vertical direction perpendicular to the horizontal direction, a cavity extending inwardly into the housing along a longitudinal direction perpendicular to the horizontal direction and the vertical direction, the cavity extending from the front opening to a back wall extending at least partially across the cavity, the cavity having a non-rectangular shape perpendicular to the longitudinal direction. A circuit board is mounted within the cavity against the back wall and has a circuit board perimeter corresponding to the non-rectangular shape. A heat conductive pad positioned between the circuit board and the back wall and having a pad perimeter. A light is mounted to the circuit board, the circuit board defining a circuit for driving the light. A transparent cover is mounted over the front opening.

The back wall may define a plug opening, the circuit board defining a cutout conforming to the plug opening. A plug may be positioned within the plug opening, the apparatus further comprising wires extending through plug and connecting to receptacles secured to the circuit board.

The heat conductive pad may be a graphite pad. The non-rectangular shape may be a cylinder. The light may be a light emitting diode (LED) or laser. The transparent cover may have areas having different optical properties from one another. The different optical properties may include facet angle, tinting, focusing, and diffusing. A plurality of fins may extend rearwardly from the back wall of the housing.

BRIEF DESCRIPTION OF THE DRAWINGS

Preferred and alternative examples of the present invention are described in detail below with reference to the following drawings.

DETAILED DESCRIPTION OF THE PREFERRED EMBODIMENT

Figure 1:
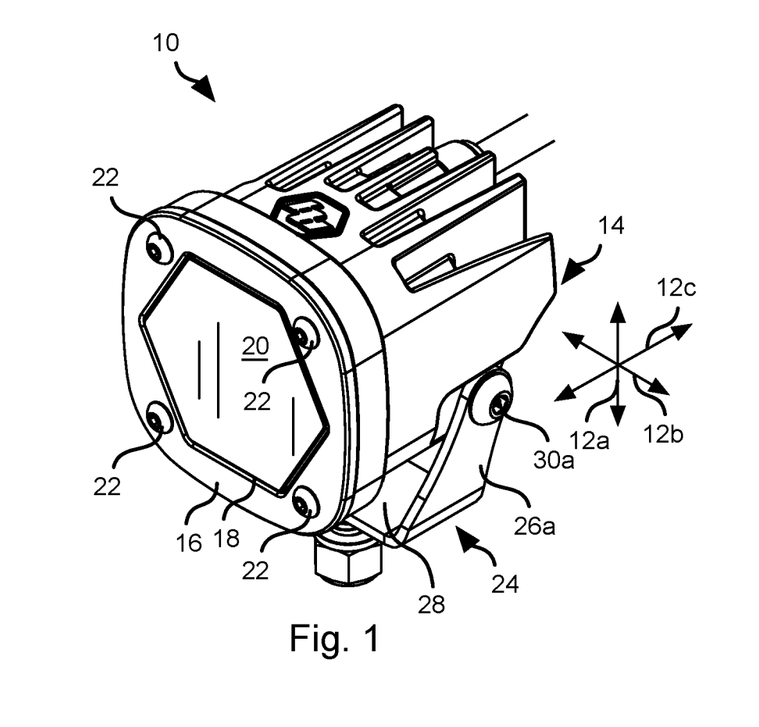
FIG. 1 is an isometric view of an auxiliary light in accordance with an embodiment of the present invention.
Figure 2:
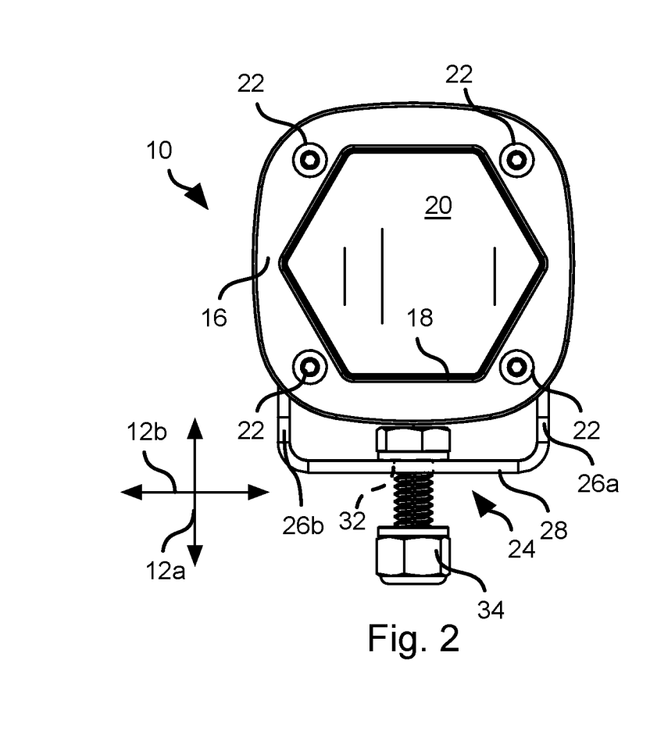
FIG. 2 is a front view of the auxiliary light of FIG. 1.

Referring to FIGS. 1 and 2, an auxiliary light 10 as described herein may be understood with respect to a vertical direction 12a, a horizontal direction 12b and a longitudinal direction 12c that are all mutually perpendicular. These directions are defined to enable an understanding of the relative orientation and position of portions of the invention but need not correspond to global vertical, horizontal, and longitudinal directions when in use.

An auxiliary light 10 may be used in various applications such as secured to a vehicle such as a four-wheeled road or off-road vehicle, bicycle, motorcycle, boat, or any other type of vehicle. The light may also be secured to other articles, such as a helmet of a driver of a vehicle. The auxiliary light 10 may also be secured to a fixed structure rather than a vehicle.

The light 10 includes a housing 14 covered at its front by a front bezel 16 defining an opening 18. The opening 18 may be covered by a transparent layer 20 that may be transparent plastic or glass. The transparent layer 20 may also function as a lens to focus or diffuse light. The transparent layer may be textured or contoured in order to diffuse light passing therethrough. In the illustrated embodiment, the transparent layer 20 is substantially (e.g., within 5 degrees of) parallel to a vertical-horizontal plane parallel to the vertical direction 12a and horizontal direction 12b. A front surface of the bezel 16 and the front of the housing 14 that engages the bezel 16 may also be substantially parallel to the vertical-horizontal plane.

In the illustrated embodiment, the bezel 16 secures to the front of the housing 14 having the transparent layer 20 captured between itself and the perimeter of the front of the housing thereby securing the transparent layer 20 to the housing 14. For example, fasteners such as screws 22 may pass through the bezel 16, or both the bezel 16 and the transparent layer, and engage corresponding threaded openings defined by the housing 14. The screws 22 may be any type of screw known in the art and may preferably have rounded heads to avoid catching on anything or accumulating debris.

The light 10 may be secured to a vehicle or other structure by means of a mount 24. The mount 24 may be embodied as a bracket including a left arm 26a, a right arm 26b and a cross piece 28 extending between the arms 26a, 26b. The arms 26a, 26b and cross piece 28 may be a single member having end portions bent upward relative to the cross piece 28 to form the arms 26a, 26b. The arms 26a, 26b may be bent such that they are substantially perpendicular to the cross piece 28.

The left arm 26a may be attached to a left pivot 30a on a left side of the housing 14 and the right arm 26b may be attached to a right pivot 30b (shown in FIG. 4) on a right side of the housing 14. For example, the arms 26a, 26b may define apertures through which pivots 30a, 30b (e.g., bolts) pass and engage the housing 14.

The cross piece 28 may receive a fastener 34 for securing the cross piece 28 to a vehicle or other structure. In some embodiments, the fastener 34, i.e. an aperture 32 in the cross piece 28 that receives it, may be centered along the horizontal direction 12b between the arms 26a, 26b. The fastener 34 and aperture that receives it may also be substantially collocated with a center of gravity of the light 10, e.g. offset from the location of the center of gravity by no more than 5%, preferably less than 2%, of the length of the light 10 in the longitudinal direction 12c when the bezel 16 is parallel to the vertical-horizontal plane.

Figure 3:
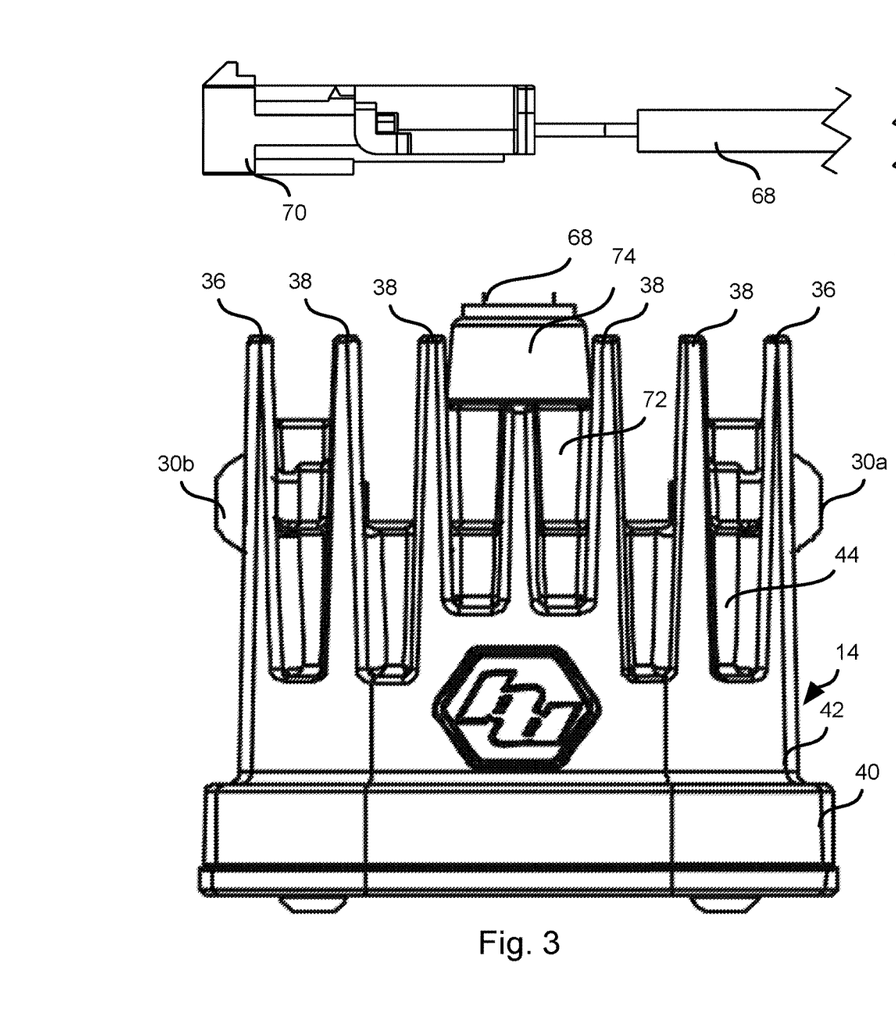
FIG. 3 is a top view of the auxiliary light of FIG. 1.
Figure 4:
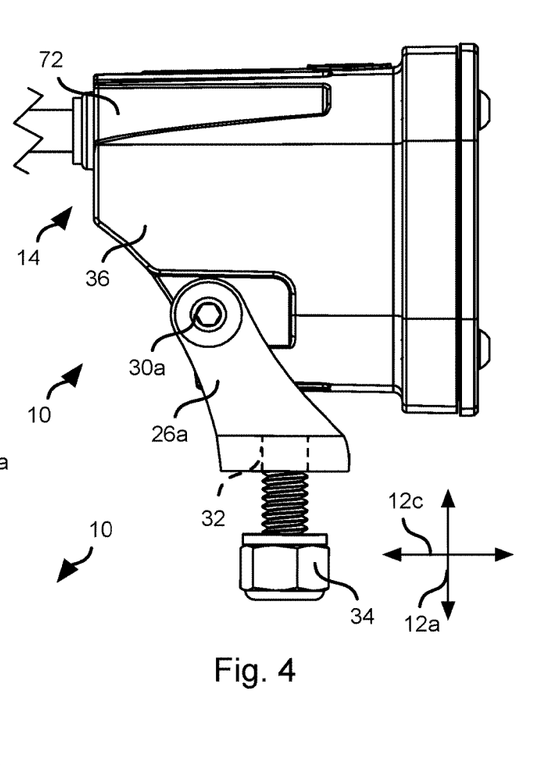
FIG. 4 is a side view of the auxiliary light of FIG. 1.
Figure 5:
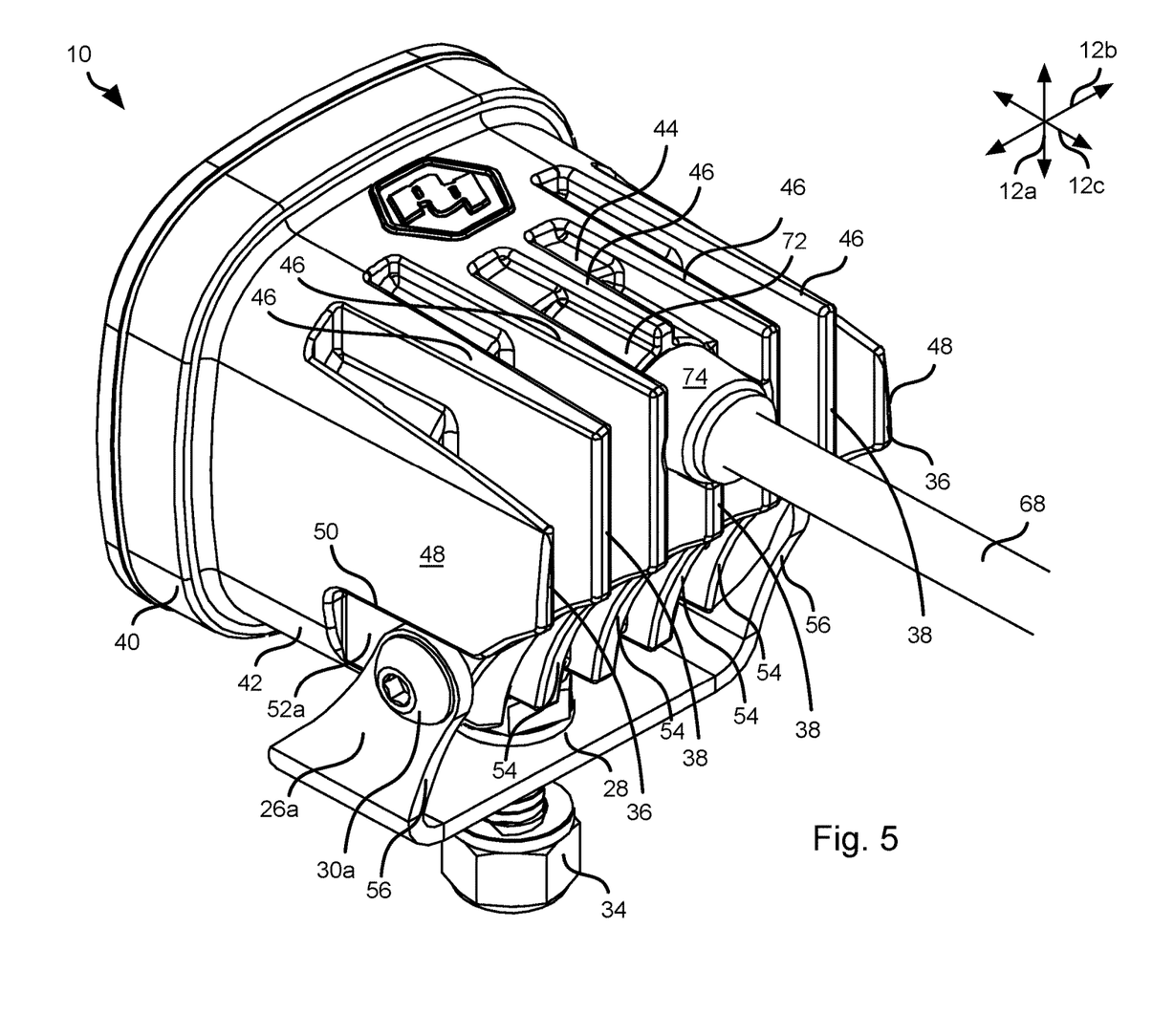
FIG. 5 is a rear isometric view of the auxiliary light of FIG. 1.

Referring to FIGS. 3, 4, and 5, the housing 14 may be provided with fins to facilitate cooling. In particular there may be outer fins 36 on the left and right sides and inner fins 38 positioned between the outer fins. The outer fins 36 may be shorter along the vertical direction 12a then the inner fins 38 thereby improving airflow over the inner fins 38. For example, the outer fins 38 may slope downwardly with distance from the middle section 42 to a greater extent than the inner fins 38. The fins 36, 38 may be much thinner along the horizontal direction 12b than their height along the vertical direction 12a.

As is apparent in FIGURES, lateral surfaces of the outer fins 36 and top and bottom surfaces of the inner fins 38 are continuations of a surface of the housing 14 from which they emanate. For example, the bezel 16 may be a "rounded rectangle," which may be defined as a rectangle or square having its sides bowed outwardly and its corners rounded. The housing may include, starting from the bezel 16 and moving rearwardly along the longitudinal direction 12c, a front section 40, middle section 42, and rear section 44. Each of these sections 40-44 may have the same rounded rectangle shape. In the illustrated embodiment, moving rearwardly from the bezel 16, each section has a cross section in the vertical-horizontal plane that is a scaled down version of the cross section of the section preceding it. As shown in FIGURES, there may be a gradual transition (chamfer or bevel) between each section 40-44 and an adjacent section 40-44.

In the illustrated embodiments, the upper surfaces and lower surfaces of the inner fins 46 and lateral surfaces of the inner fins may be continuations of the rounded rectangular cross section of the middle section 42. In some embodiments, the rounded rectangle shape of the middle section 40 is tapered, i.e. is scaled down with distance from the front section 40. The surfaces of the fins 36, 38 that are continuations o the middle section 40 may continue this taper.

In the horizontal-longitudinal plane parallel to the horizontal direction 12b and longitudinal direction 12c, the thickness of the fins 36, 38 narrows with distance from the middle section 42 along the longitudinal direction 12c. As is apparent in FIG. 5, there may be curved transitions between the upper and lower surfaces of the inner fins 38 and the vertical surfaces of the fins 38. Likewise, there may be a curved transition between outer surfaces of the outer fins 36 that are continuations of the middle section 42 and inward facing surfaces of the outer fins 36. Rear facing edges of the fins 36, 38 may also be rounded, chamfered, or otherwise smoothed.

Referring specifically to FIG. 5, various features may be formed in the fins 36, 38 to facilitate functionality of the light 10. For example, a lower-rear portion of the outer fins 36 may define cutouts 50 to provide clearance for the pivots 30a, 30b. In the illustrated embodiment, flanges 52a, 52b project rearwardly along the longitudinal direction 12c from the rear surface of rear section 44 and into the cutouts 50. The flanges 52a, 52b may then define apertures for receiving the pivots 30a, 30b. The cutouts 50 may enable the light 10 to rotate about the pivots 30a, 30b with some range of motion e.g., 120 to 180 degrees, without interfering with the arms 26a, 26b.

In some embodiments, rearmost portions of the bottom edges of the fins 36, 38 may arc upwardly, i.e. the fins 36, 38 may define a concave arcuate edge 54 extending from the bottom edges to the rear edges of the fins 36, 38, where concave indicates bowing inward. The concave arcuate edge 54 may provide clearance for the cross piece 28 of the mount 24 when the light 10 is pivoted with the transparent cover 20 facing substantially upwardly along the vertical direction 12c. In the illustrated embodiment, the arcuate edges 54 are positioned completely rearward from the rear section 44 of the housing 14 along the longitudinal direction 12c.

In some embodiments, rear edges 56 of the arms 26a, 26b may also have a concave arcuate shape. In some embodiments, the radius of curvature of the rear edges 56 is substantially equal to (e.g., within +/− 5% of) the radius of curvature of the concave arcuate edges 54. In some embodiments, the arcuate edges 54, 56 may define other concave shapes, such as a series of two or more facets that bow inward.

As apparent particularly in FIG. 4, the center of the fastener 34 and/or the opening 32 in the cross piece 28 that receives the fastener 34 and the center of the pivots 30a, 30b may be offset from one another along the longitudinal direction 12c. For example, this offset may be between 15 and 30 percent of the length of the light 10 in the longitudinal direction 12c when the bezel 16 is parallel to the vertical-horizontal plane. This offset may facilitate rotation of the light 10 without interference with the cross piece 28 of the mount 24.

Figure 6:
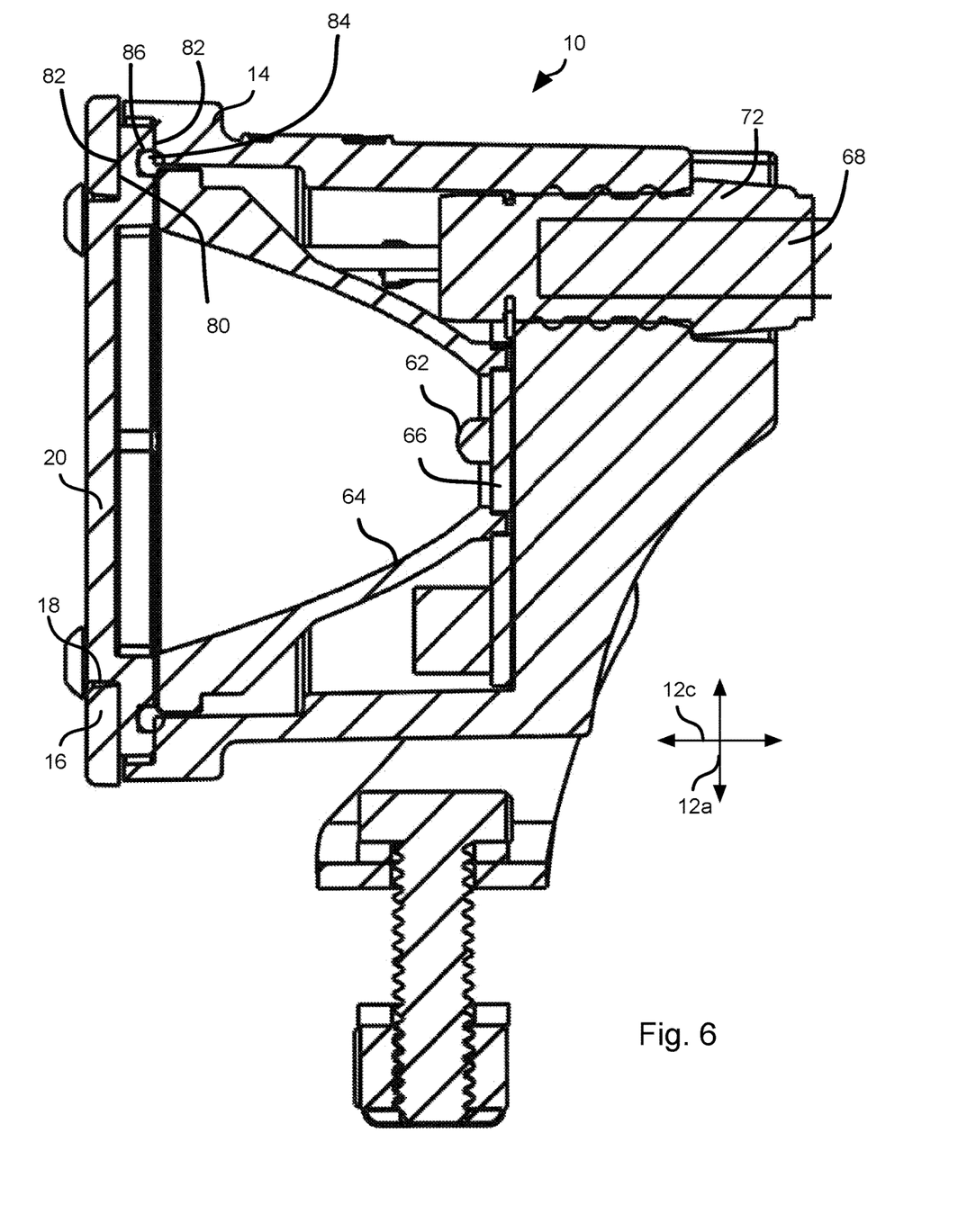
FIG. 6 is side cross-sectional view showing a configuration of a lens and bezel in accordance with an embodiment of the present invention.

Referring to FIG. 6, while still referring to FIGS. 3, 4, and 5, the housing 14 may contain various components for implementing the light 10. For example, a reflector 64 having a parabolic or other shape may secure to the front of the housing 14 adjacent the transparent cover 20. A light 62 may be mounted such that it emits light through the transparent cover 20 and onto the reflector 64. The light 62 may include one or more a Light Emitting Diodes ("LED"), laser/pphosphorus or gallium white light emitter, or other type of light source. The housing 14 may further contain a drive circuit 66 configured to supply power to the light 62. The driver circuit 66 may be coupled to a power cable 68 entering the housing 14, such as through the rear surface of the rear section 44. The cable 68 may have at its other end a plug 70 for engaging a socket defined by the electrical system of a vehicle to which the light 10 is mounted or to some other source of electrical power. In some embodiments, turning the light 10 on and off may be controlled by controlling supply of power through the cable 68 such that switches are not provided on the light 10 itself. In other embodiments, a switch for turning the light 10 on and off may be provided on the housing 14.

As is visible in FIGS. 3, 5, and 6, a sleeve 72 may protrude from the rear surface of the rear section 44 of the housing 14. The sleeve 72 may be integrally formed with the rear section 44 and fins 38. For example, as shown in FIG. 5, the sleeve 72 may extend through one of the inner fins 38, such as the center fin 38, such that portions of the fin 38 protrude above and below the sleeve 72 in the vertical direction 12a. As shown in FIG. 5, fins 38 on either side of the center fin may include cutout portions to provide clearance for the cable 68, such as f or a flexible sleeve 74 surrounding the cable 68 and extending into the sleeve 72.

Referring specifically to FIG. 6, in some embodiments, the transparent layer 20 may include a circumferential recess 80 extending around its perimeter, such as a recess 80 formed by machining away a portion of the perimeter of the transparent layer 20. The housing 14 may define a corresponding recess 82 that receives the portion of the perimeter of the transparent layer 20. The depths of the recesses 80 be such that when the bezel 16 is placed in the recess 80, the portion of the transparent layer 20 surrounded by the recess 80 protrudes through the opening 18 in the bezel 16 and is substantially flush with the front surface of the bezel 16, e.g., within 1 mm, preferably within 0.2 mm, of flush. In this manner, the gathering of debris in any protruding or recessed surfaces on the face of the light 10 is reduced.

In order to keep contaminants out of the housing 14, an O-ring 84 may be captured between the housing 14 and the transparent layer 20. In the illustrated embodiment, the O-ring seats within a groove 86 formed in the transparent layer opposite the recess 80. As is apparent in FIG. 6, the O-ring protrudes from the groove 86 and engages the housing 14, such as a forward facing wall of the recess 82 defined by the housing 14.

Figure 7:
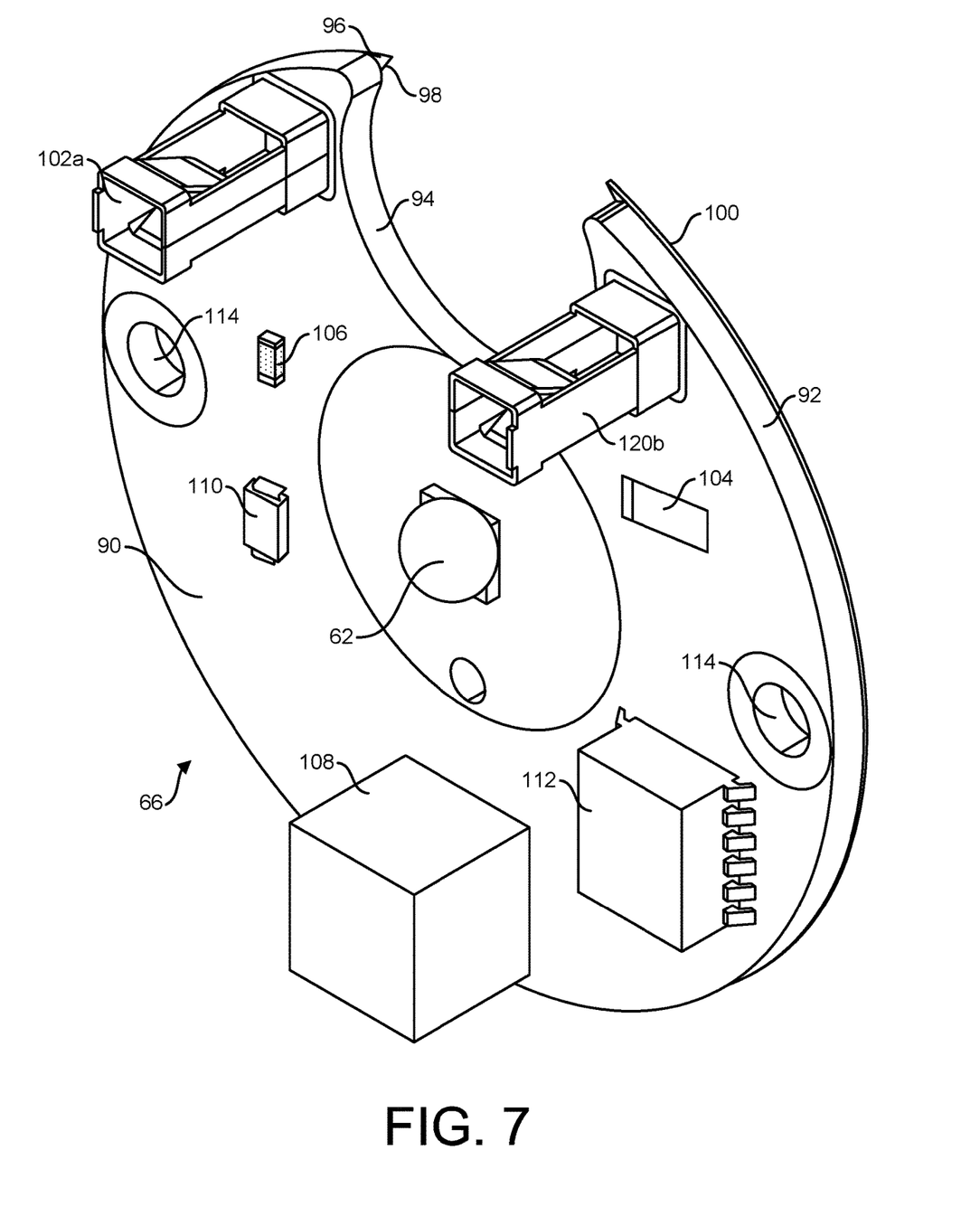
FIG. 7 is an isometric view of a circuit board for use in the auxiliary light in accordance with an embodiment of the present invention.
Figure 8:
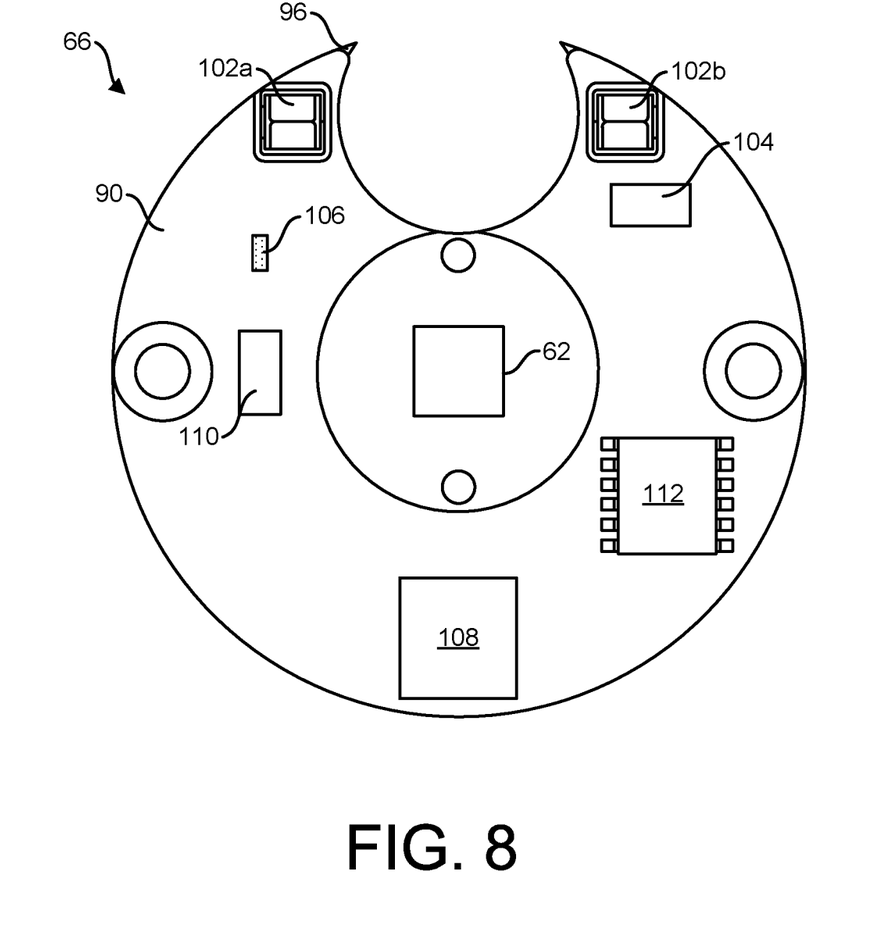
FIG. 8 is a front view of the circuit board of FIG. 7.

Referring to FIGS. 7 and 8, a light 10 may include the illustrated circuit board 90. The circuit board 90 may implement the driver circuit 66 for any of the foregoing embodiments. The circuit board 90 may have a non-rectangular perimeter that may be sized to conform to a cavity defined by the housing 14. As used herein, non-rectangular shall be understood as being such that there is no rectangle such that at least 80 percent of the perimeter of the circuit board 90 lies on the rectangle.

In the illustrated embodiment, the perimeter includes an outer circular portion 92, e.g. a circular arc of between 300 and 360 degrees. The perimeter may include one or more concave surfaces to provide clearance for features present within the cavity defined by the housing 14. For example, a cutout 94 may extend inwardly from the circular outer perimeter 92. In the illustrated embodiment, the cutout 94 is circular but other shapes may also be used. Likewise, the circular outer perimeter 92 may have other non-rectangular shapes such as elliptical, oval, octagonal, triangular, or other random shape including one or both of concave and convex portions.

The circuit board 90 may have a front surface having the light 62 mounted thereon. The light 62 may include one or more a Light Emitting Diodes ("LED"), laser/pphosphorus or gallium white light emitter, or other type of light source. A rear surface of the circuit board 90 may interface with a heat-conductive pad 96. The heat conductive pad 96 may be made of a solid but malleable heat conductive material able to conform to non-planar features on the rear surface of the circuit board 90 and non-planar features on a surface of the cavity of the housing 14 contacted by the pad 96. One example material is graphite. The graphite may be adhered to the circuit board 90, a surface of the cavity defined by the housing 14, or may be held in place due to clamping between the circuit board 90 and the surface of the cavity defined by the housing 14. The pad may have a thickness at least as great as an expected degree of non-planarity of the rear surface of the circuit board 90 and the surface of the cavity. For example, a thickness of between 0.5 and 2 mm may be suitable for most applications. The rear surface of the circuit board may be coated with metal, such as copper either as a continuous ground plane or as traces for routing electrical signals.

As is apparent in FIG. 7, the pad 96 may confirm generally to the perimeter of the circuit board 90, including the circular outer perimeter 92 and one or more cutouts 94. For example, the perimeter of the pad may include a cutout portion 98 and a circular outer portion 100 that extend outwardly from the cutout 94 and circular outer perimeter 92 by between 0.1 and 2 mm. Alternatively, the perimeter portions 98, 100 may extend inwardly from the perimeter portions 94, 92 by between 0.1 and 2 mm.

The front surface of the circuit board 90 may have one or more components mounted thereon to facilitate driving of the light 62. For example, two or more electrical receptacles 102a, 102b may be fastened to the front surface, such as on either side of the cutout 94 for receiving wires 122a, 122b extending from a plug 120 extending to or through the cutout 94. Other components mounted to the forward surface may include a resistor 104, capacitor 106, inductor 108, diode 110, and an integrated circuit 112 programmed to control operation of the light 62. The circuit board 90 may further define one or more openings 114 for receiving fasteners for securing the circuit board 90 within the cavity defined by the housing 14.

Figure 9:
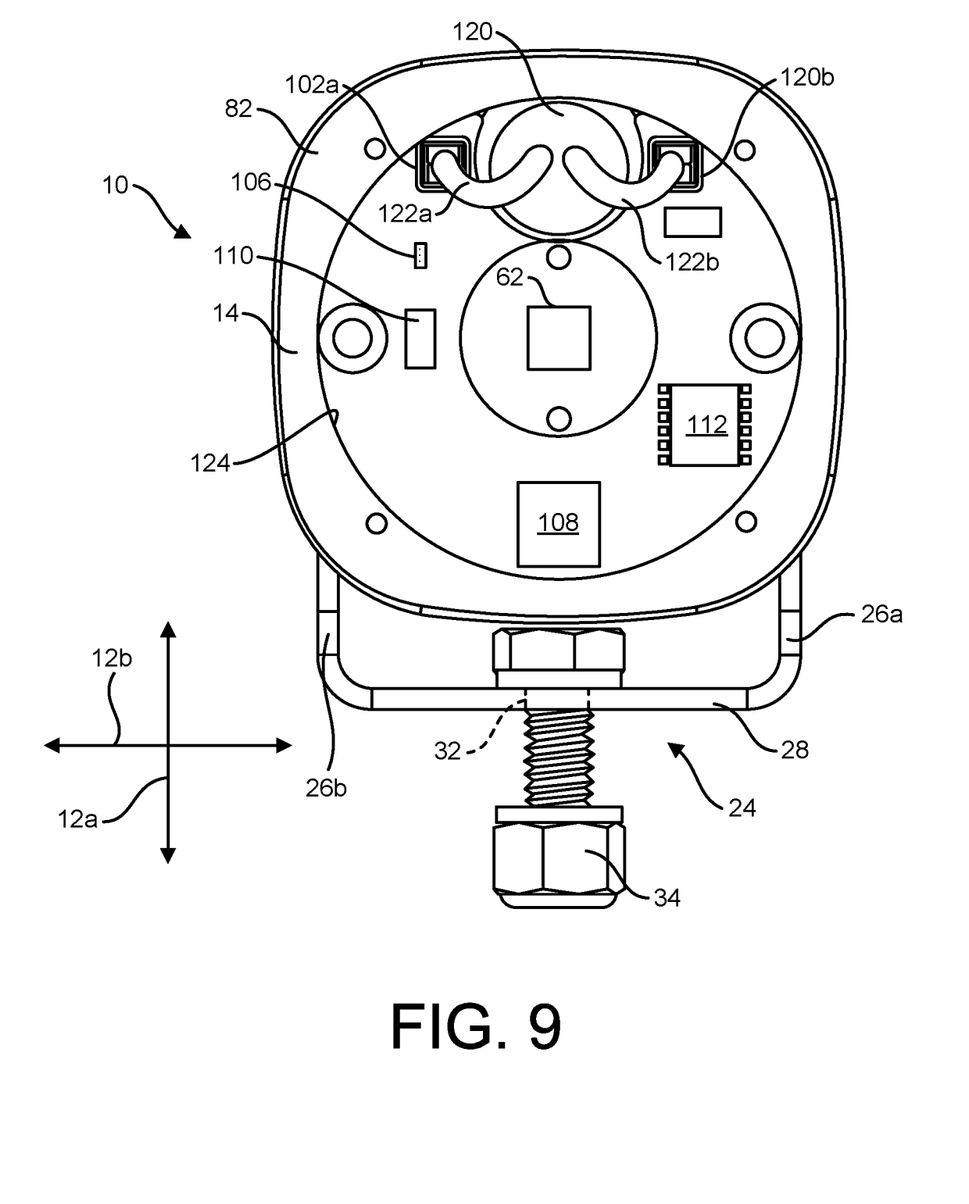
FIG. 9 is a front view of a housing of the auxiliary light having the circuit board of FIG. 7 positioned therein in accordance with an embodiment of the present invention.
Figure 10:
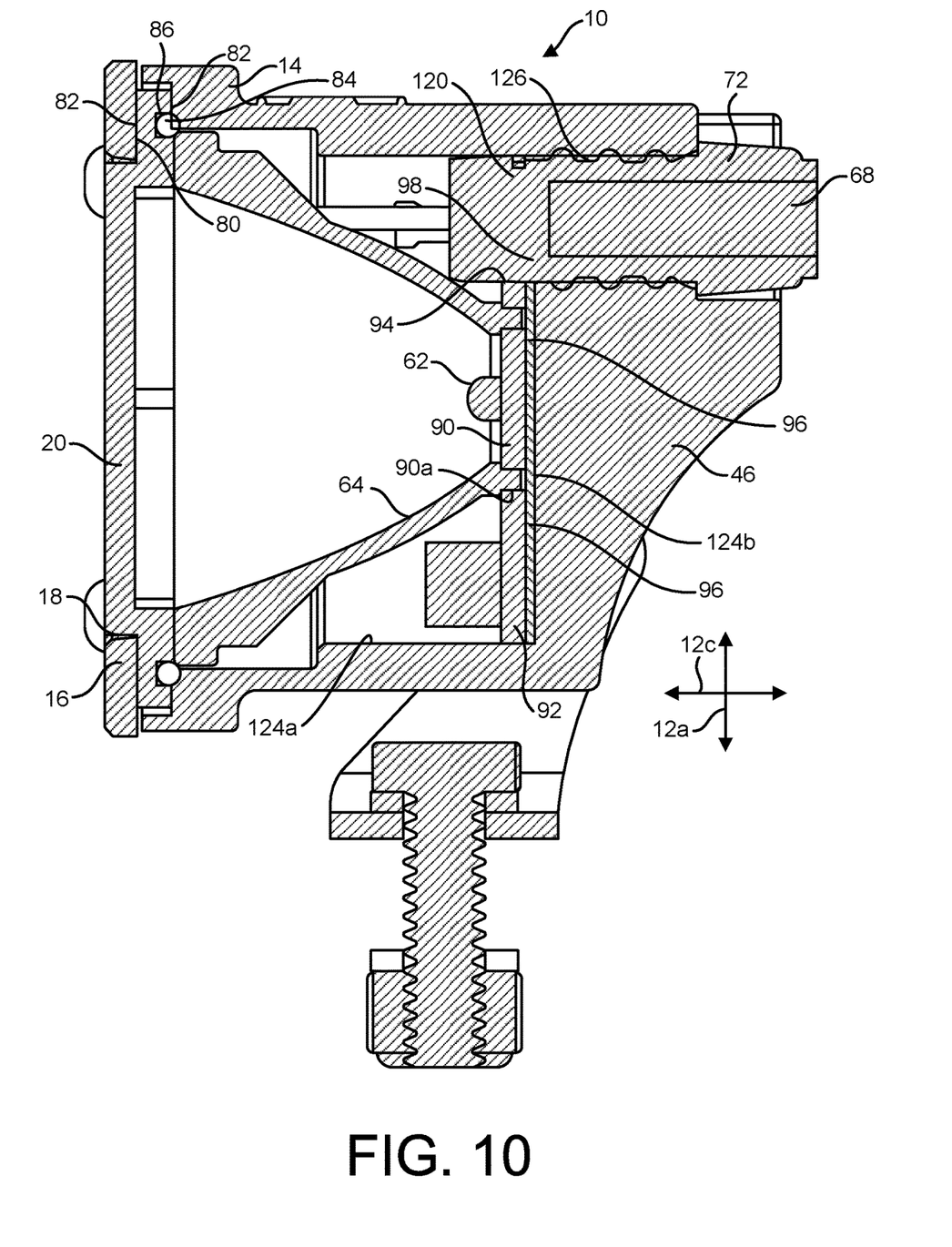
FIG. 10 is side cross-sectional view showing the auxiliary light including the circuit board of FIG. 7 in accordance with an embodiment of the present invention.

FIGS. 9 and 10 illustrate the circuit board 90 and pad 96 in place within the housing 40. The cavity defined by the housing 14 may include a sidewall 124a having a closed shape around its central axis, such as a cylinder symmetrical about the central axis or other shape corresponding to the shape of the outer perimeter 92 of the circuit board 90. The central axis may be substantially parallel (e.g., within 2 degrees of) to the longitudinal direction. A back wall 124b of the housing 14 may extend across one end of the housing 14 except for an opening 126 for insertion of the plug 120. The cutout 94 may conform to the opening 126, e.g. each point on the cutout 94 may be within 0.5 to 2 mm of the opening 126 when the circuit board 90 is positioned against the backwall. In the illustrated embodiment, the back wall 124b is substantially (e.g., within 2 degrees of) perpendicular to the central axis of the sidewall 124a. An end of the sidewall 124a opposite the back wall 124b may define an opening that is covered by the transparent cover 20. A reflector 64 may extend from the circuit board 90 either partially or completely toward the transparent cover 20 as for other embodiments disclosed herein. As shown in FIG. 10, the circuit board 90 may define a circular groove 90a for receiving the reflector 64.

The transparent cover may be shaped, faceted (e.g., include facets of different angles) and/or tinted to achieve a desired degree of focus and long range illumination using the light emitted by the light 62. The transparent cover 20 may contain regions with different optical properties focusing, diffusing or directing portions of the light energy to vary the horizontal and vertical degrees of illumination.

As is apparent in FIG. 10, the pad 96 may be captured between the rear surface of the circuit board 90 and the back wall 124b. Fasteners passing through the opening 114 in the circuit board 90, e.g., screws, and engaging the housing 14 may secure the circuit board 90 and pad 96 in place. Due to the conformance of the perimeter 92 to the shape of the sidewall 124a, the surface area of the circuit board 90 in contact with the back wall 124b is increased relative to the largest rectangle that can occupy the area perpendicular to the central axis of the sidewall 124a and enclosed by the sidewall 124a. Likewise, the use of a cutout 94 ensures that the area of the circuit board 90 in contact with the back wall 124b is larger than such a rectangle that also provides clearance for the plug 120 and wires 122a, 122b emanating from the plug 120.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The invention claimed is:

1. An auxiliary light including:
   a housing defining a front opening extending in a horizontal direction and a vertical direction perpendicular to the horizontal direction, a cavity extending inwardly into the housing along a longitudinal direction perpendicular to the horizontal direction and the vertical direction, the cavity extending from the front opening to a back wall extending at least partially across the cavity, the cavity having a non-rectangular shape perpendicular to the longitudinal direction;
   a circuit board mounted within the cavity against the back wall and having a circuit board perimeter corresponding to the non-rectangular shape;
   a heat conductive pad positioned between the circuit board and the back wall and having a pad perimeter;
   a light mounted to the circuit board, the circuit board defining a circuit for driving the light; and
   a transparent cover mounted over the front opening;
   wherein a first portion of the circuit board perimeter defines a circular shape and a second portion of the circuit board perimeter defines a notch extending inwardly from the first portion;
   wherein the back wall defines a plug opening aligned with the notch;
   wherein a first receptacle is secured to the circuit board on a first side of the notch and a second receptacle is secured to the circuit board on a second side of the notch having the notch positioned between the first receptacle and the second receptacle; and
   wherein a first wire and a second wire pass through the plug opening, the first wire secured within the first receptacle and the second wire secured within the second receptacle.

2. The auxiliary light of claim 1, wherein the heat conductive pad is a graphite pad.

3. The auxiliary light of claim 2, wherein the conductive pad has a thickness of 0.5 to 2 mm.

4. The auxiliary light of claim 1, wherein the non-rectangular shape is a cylinder.

5. The auxiliary light of claim 1, wherein the light is a light emitting diode (LED).

6. The auxiliary light of claim 1, wherein the light is a laser.

7. The auxiliary light of claim 1, wherein the transparent cover has areas having different optical properties from one another.

8. The auxiliary light of claim 7, wherein the different optical properties include facet angle, tinting, focusing, and diffusing.

9. The auxiliary light of claim 8, further comprising a plurality of fins extending rearwardly from the back wall of the housing.

10. The auxiliary light of claim 1, wherein the heat conductive pad is a graphite pad.

11. The auxiliary light of claim 1, wherein the light is a light emitting diode (LED).

12. An auxiliary light including:
    a housing defining a front opening extending in a horizontal direction and a vertical direction perpendicular to the horizontal direction, a cavity extending inwardly into the housing along a longitudinal direction perpendicular to the horizontal direction and the vertical direction, the cavity extending from the front opening to a back wall extending at least partially across the cavity, the cavity having a non-rectangular shape perpendicular to the longitudinal direction;
    a plurality of fins mounted to the housing and extending rearwardly from the front opening along the longitudinal direction, the plurality of fins being thinner in a horizontal plane parallel to the horizontal direction and the longitudinal direction that in a vertical plane parallel to the horizontal direction and the vertical direction;
    a circuit board mounted within the cavity against the back wall and having a circuit board perimeter corresponding to the non-rectangular shape;
    a heat conductive pad positioned between the circuit board and the back wall and having a pad perimeter;
    a light mounted to a front surface the circuit board, the circuit board defining a circuit for driving the light; and
    a transparent cover mounted over the front opening;
    wherein a first portion of the circuit board perimeter conforms to a first circular shape and a second portion of the circuit board perimeter conforms to a second circular shape smaller than the first circular shape, the second portion extending inwardly from the first portion;
    wherein the back wall defines a plug opening aligned with the second portion;
    wherein a first receptacle is secured to the circuit board on a first side of the second portion and a second receptacle is secured to the circuit board on a second side of the second portion having the second portion positioned between the first receptacle and the second receptacle, the first receptacle and the second receptacle protruding from the front surface of the circuit board; and
    wherein a first wire and a second wire pass through the plug opening, the first wire secured within the first receptacle and the second wire secured within the second receptacle.

13. The auxiliary light of claim 12, wherein the non-rectangular shape is a cylinder.

14. The auxiliary light of claim 12, wherein the light is a laser.

15. The auxiliary light of claim 12, wherein the transparent cover has areas having different optical properties from one another.

16. The auxiliary light of claim 15, wherein the different optical properties include facet angle, tinting, focusing, and diffusing.

* * * * *

UNITED STATES PATENT AND TRADEMARK OFFICE
CERTIFICATE OF CORRECTION

PATENT NO. : 11,067,254 B1
APPLICATION NO. : 17/107642
DATED : July 20, 2021
INVENTOR(S) : Christopher Johnson Page 1 of 1

It is certified that error appears in the above-identified patent and that said Letters Patent is hereby corrected as shown below:

On the Title Page

Item (63), in the continuity type, the word "Continuation" should read --Continuation-in-Part--.

In the Claims

In Column 8, Line 31 (Claim 12), insert --of-- between "surface" and "the".

Signed and Sealed this
Twenty-third Day of November, 2021

Drew Hirshfeld
*Performing the Functions and Duties of the*
*Under Secretary of Commerce for Intellectual Property and*
*Director of the United States Patent and Trademark Office*